United States Patent [19]

Beyerlein et al.

[11] Patent Number: 5,553,661
[45] Date of Patent: Sep. 10, 1996

[54] SOLAR POSITION CORRECTION FOR CLIMATE CONTROL SYSTEM

[75] Inventors: David G. Beyerlein, Carmel; Bruce D. Rohn, Kokomo, both of Ind.

[73] Assignee: Delco Electronics Corporation, Kokomo, Ind.

[21] Appl. No.: 547,003

[22] Filed: Oct. 23, 1995

[51] Int. Cl.$^6$ ...................................................... F25B 13/00
[52] U.S. Cl. ........................... 165/203; 165/11.1; 165/43; 236/43; 236/51; 236/91 C
[58] Field of Search ...................................... 165/2, 11, 12, 165/43; 236/51, 43

[56] References Cited

U.S. PATENT DOCUMENTS

| | | | |
|---|---|---|---|
| 5,117,744 | 6/1992 | Zimmer et al. | 236/91 C |
| 5,181,654 | 1/1993 | Yoshimi et al. | 236/91 C |
| 5,400,964 | 3/1995 | Freiberger | 236/91 C |

FOREIGN PATENT DOCUMENTS

| | | | |
|---|---|---|---|
| 0043015 | 4/1981 | Japan | 236/91 C |
| 0139816 | 8/1983 | Japan | 236/91 C |
| 0136811 | 5/1989 | Japan | 236/91 C |
| 6-087319 | 3/1994 | Japan | 236/91 C |

*Primary Examiner*—F. Daniel Lopez
*Assistant Examiner*—Mark Sgantzos
*Attorney, Agent, or Firm*—Jimmy L. Funke

[57] ABSTRACT

A vehicle heating and air conditioning system has multiple zones and a manual comfort selector for each zone. The setting for each zone is adjustable for the effects of sun intensity and sun position. A Global Position System (GPS) navigation system provides heading, longitude, latitude, time and date data from which sun position relative to the vehicle is determined, and solar sensors provide solar intensity information. An empirical table for each zone addressed by sun elevation and relative azimuth contains solar illumination factors which, along with solar intensity factors, afford an adjustment to the comfort settings, thus altering the temperature and/or flow rate of air supplied to each zone. Alternatively, in the absence of a GPS receiver, a magnetic compass is used for heading data, geographic region data is entered manually, and an on-board clock furnishes the time and date.

22 Claims, 4 Drawing Sheets

5,553,661

SOLAR POSITION CORRECTION FOR CLIMATE CONTROL SYSTEM

FIELD OF THE INVENTION

This invention relates to automotive climate control systems and particularly to a method and apparatus for adjusting the system output according the sun position and solar load.

BACKGROUND OF THE INVENTION

Electronic climate control systems for motor vehicles typically include one or more zones controllable by adjusting the temperature of air flowing into each zone (and even the rate of air flow) in accordance with temperature or comfort set points which are set by occupants of each zone and sensed air temperature in each zone. Other factors such as outside temperature and sun load which are important to occupant comfort are measured and included in a control algorithm which determines adjustments to temperature and air flow.

The sun load can have a significant effect on comfort since it impacts the overall comfort and especially has an impact when it shines directly on one or more occupants. Generally sun load is measured by solar sensors placed to detect sun light from any direction to determine a measure of the overall heat load from that source. Such measurement does not however distinguish between the effect on individuals who are exposed directly to the sun load and those who are shaded by the roof of the vehicle. As a result, the various zones receive the same adjustment for sun load while the occupants receive different amounts of sun load.

SUMMARY OF THE INVENTION

It is therefore an object of the invention to control vehicle heating and/or air conditioning to compensate for the effect of the direction as well as the amount of sun load. Another object is to automatically adjust comfort settings for sun position relative to the vehicle.

The heating, ventilating and air conditioning (HVAC) system of a vehicle equipped with electronic climate control uses a microcomputer to receive inputs from selectors and sensors to control the system mode, blower speed and mixer door positions, thereby regulating the air output to the passenger compartment. For multiple zone systems air ducts include mixer doors for individual temperature adjustment and possibly flow rate adjustment. Each zone has a comfort set point selector and an air temperature sensor, and the system in general has one or more solar load sensors, an outside air temperature sensor, and an engine coolant sensor. The latter only affects the mixer door position since the coolant temperature determines the hot air temperature in the system. In accordance with the present invention, means are provided to determine the sun position relative to the vehicle and a microprocessor algorithm uses this information as well as the selector and other sensor inputs to determine desirable air flow temperature for each zone.

Since the absolute sun position, both azimuth and elevation, at a given place depends on the time of day and time of year, the position relative to the vehicle can be determined from the geographic location, the day, the date, and the vehicle heading. The geographic position can be obtained from a satellite system known as the Global Position System (GPS) when the vehicle is specially equipped to receive this information. The time and date can also be received from the GPS system, and information giving the heading of the vehicle is also available if the vehicle is moving. Alternatively, a magnetic compass can provide the heading on an instantaneous basis. Where the vehicle is equipped with a radio having a clock function, the time and possibly the date could be obtained from that source. For vehicles not equipped for GPS reception, geographic location may also be entered manually, and to the extent that the vehicle remains within a certain range of the set location, the location data will be adequate. However the data is obtained, the sun position is calculated and its effect on occupant comfort is also calculated.

To convert sun position, expressed as elevation and azimuth relative to the vehicle, to a comfort adjustment, a table of sun illumination factors (SIFs) is empirically established for each passenger zone with rows and columns corresponding to elevation and azimuth. Each factor indicates the effect of sun load on that zonee for a given sun position in accordance with whether the zone is in full or partial sun or in shade. The algorithm then uses the SIF for each zone multiplied by the measured solar load to determine the adjustment for each zone to the inlet air temperature and/or air flow rate.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
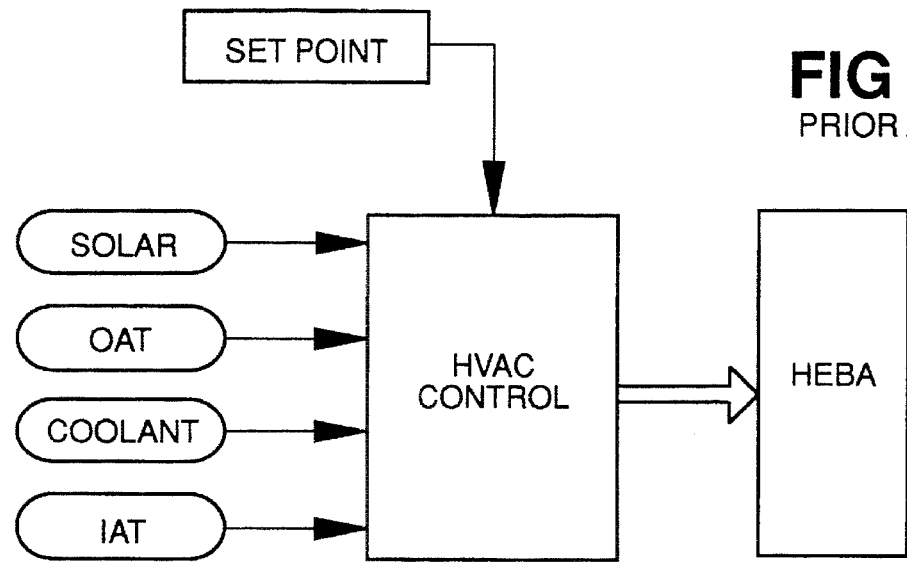
FIG. 1 is a schematic view of an HVAC system according to the prior art.

Referring first to FIG. 1, a conventional vehicle climate control is shown comprising a heating, ventilation and air conditioning (HVAC) control comprising a conventionally known microcomputer (not illustrated) having a central processing unit, ROM, RAM, I/O ports and A/D converters which receive various analog input signals from individual sensors and digitize the same for use in automated control of passenger compartment thermal level. Interior air temperature (IAT) sensor provide the primary input to HVAC control with outside air temperature (OAT) sensor and solar load (SOLAR) providing further data to HVAC control for climate control. OAT sensor provides in conjunction with IAT sensor a differential measurement between the passenger compartment and the exterior environment which effects the rate of heat transfer therebetween, while solar sensor provides a measure of the intensity of the solar radiation on the vehicle interior which provides radiant heat within the passenger compartment. Coolant temperature (COOLANT) sensor provides a signal to HVAC control which is indicative of the availability of heat from the heater core. Another input to the control includes an operator selected temperature setting signal (SET POINT) corresponding to the desired thermal level. The various inputs are monitored and processed for controlling temperature maintenance functions of the heater, evaporator and blower assembly (HEBA) which, as the name suggests, includes; a heater core for circulating engine coolant for warming air, an evaporator core for circulating refrigerant for cooling air, a blower or fan for circulating air through the heater and evaporator cores in proportion to the position of an air mix door as determined by solenoid operated vacuum switches or electrical motors responsive to the HVAC controller outputs. The position of the air mix door determines the temperature of the air circulated by HEBA. The HEBA often times further includes Control of exiting air to passenger determined modes such as lower, upper, bi-level, defog and defrost and entering air between fresh and recirculated modes. Solenoid controlled vacuum actuators responsive to HVAC commands are the most prevalent actuators used for motive control of air delivery doors effective to establish the modes as describe above. Electrical motor control of air delivery doors is also practiced in the art.

Control processing is advantageously described in terms of establishing a program number (PGMno) and air mix door number MIXno though other alternatives will be readily apparent to those possessing ordinary skill in the art. PGMno is conventionally established according to the following function:

$$PGMno = IAT + 5*(SET\ POINT) + SOLAR + OAT\_COR + K)$$

where IAT is the internal air temperature signal, SET POINT is the operator temperature setting, SOLAR is the sun load measured by the SOLAR sensor, OAT_COR is an outside air temperature correction factor from a calibretion table addressed by the value from the OAT sensor, and K represents a calibration constant to scale PGMno into a number range compatible with the microcomputer architecture (0<PGMno<255 for 8bit architecture). PGMno is then utilized to reference blower speed and mode for HEBA operation through calibration tables.

For control of mixer door position, MIXno is established as a function of the measured coolant temperature and the PGMno. MIXno is then utilized to select a temperature door position from a mix door position look-up table. This selected door position is used in positioning the air mix door in HEBA.

For multiple zone systems a manually controlled setting and a temperature sensor is provided for each zone, and air ducts to each zone are controlled by individual mix doors. A primary zone serving the vehicle operator is controlled in the conventional manner and where any other zone set point differs from the primary setting, the difference is used to determine appropriate adjustment of the mix doors in the duct serving such other zone.

The ensuing description is directed to a vehicle heating and air conditioning system serving individual zones in the passenger compartment and compensating for temperature variations among zones due to sun position. The compensation scheme applies also to single zone systems to optimize driver or front seat comfort in accordance with variable sun load.

Figure 2:
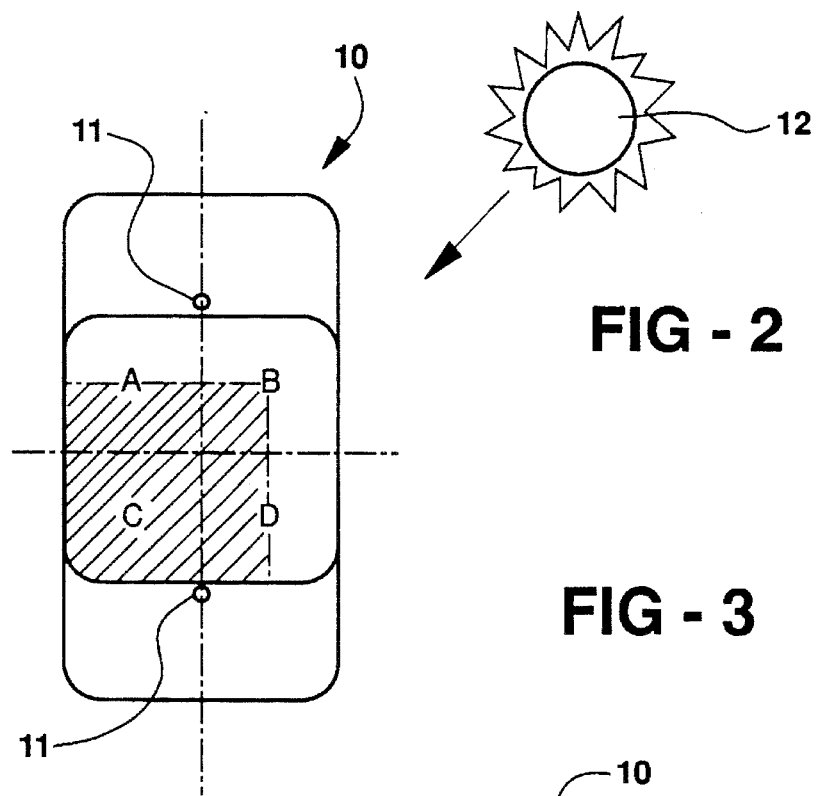
FIG. 2 is a top view of a vehicle subject to solar load.
Figure 3:
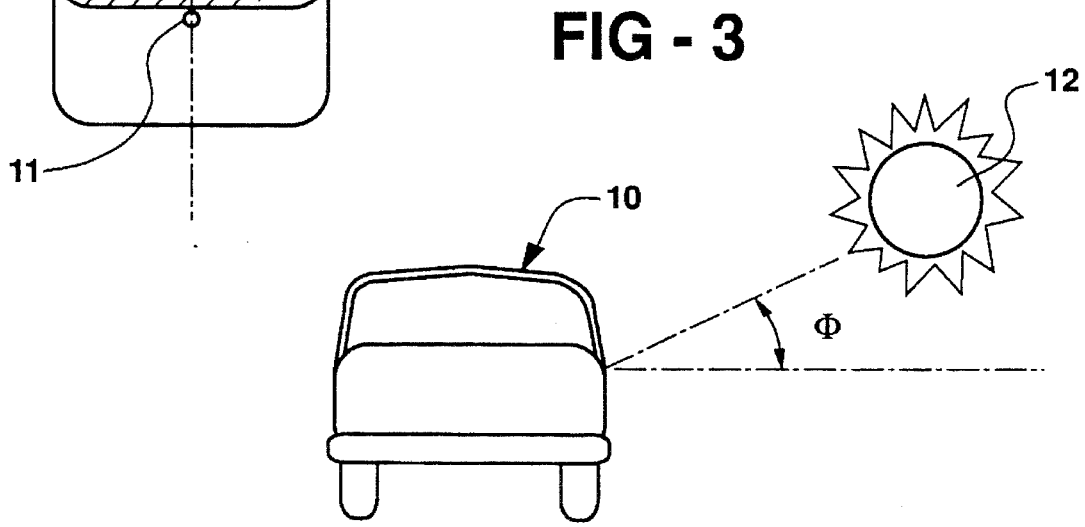
FIGS. 3 and 4 are schematic diagrams of a vehicle and sun position.
Figure 4:
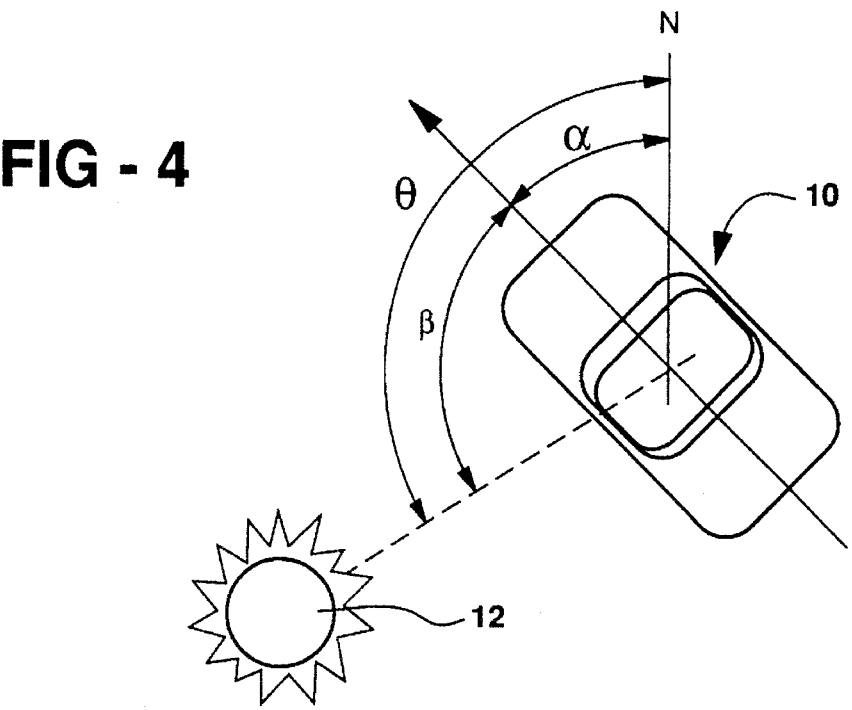

FIG. 2 is a top view of an automobile 10 indicating the passenger compartment divided into four zones, A, B, C, and D. Heated or cooled air is supplied to each zone from a common HVAC system having separate ducts incorporating controlled mixer doors to adjust the ratio of warm and cool air admitted to each zone. Similar controlled doors may also be used to vary the air flow rate. The control for each zone includes a temperature or comfort selector which is manually adjusted by an occupant according to personal preference. In order for the HVAC system to accommodate each zone set point, an arrangemt for determining the sun position is used along with a measure of sun brightness to calculate the sun load on each zone. Two or more solar sensors 11 which may be just inside the vehicle windows respond to the sun intensity. The highest reading of the sensors is accepted as the sun brightness measure since shading may influence sensor readings. As indicated in FIG. 3, the sun 12 elevation $\Phi$ is important in determining the extent of sun radiation entering the vehicle windows. When the sun is directly overhead ($\Phi=90°$) the four zones experience approximately equal sun loads. For other sun elevations, certain zones receive more direct sun energy than others; the shaded area in FIG. 2 is an example of a low sun load region covering zone C and only parts of the other zones. The azimuth $\beta$ of the sun relative to the vehicle, as shown in FIG. 4 determines which zones are in full sun, partial sun, or shade. These two parameters define the sun position for determining sun load on each zone.

Figure 5:
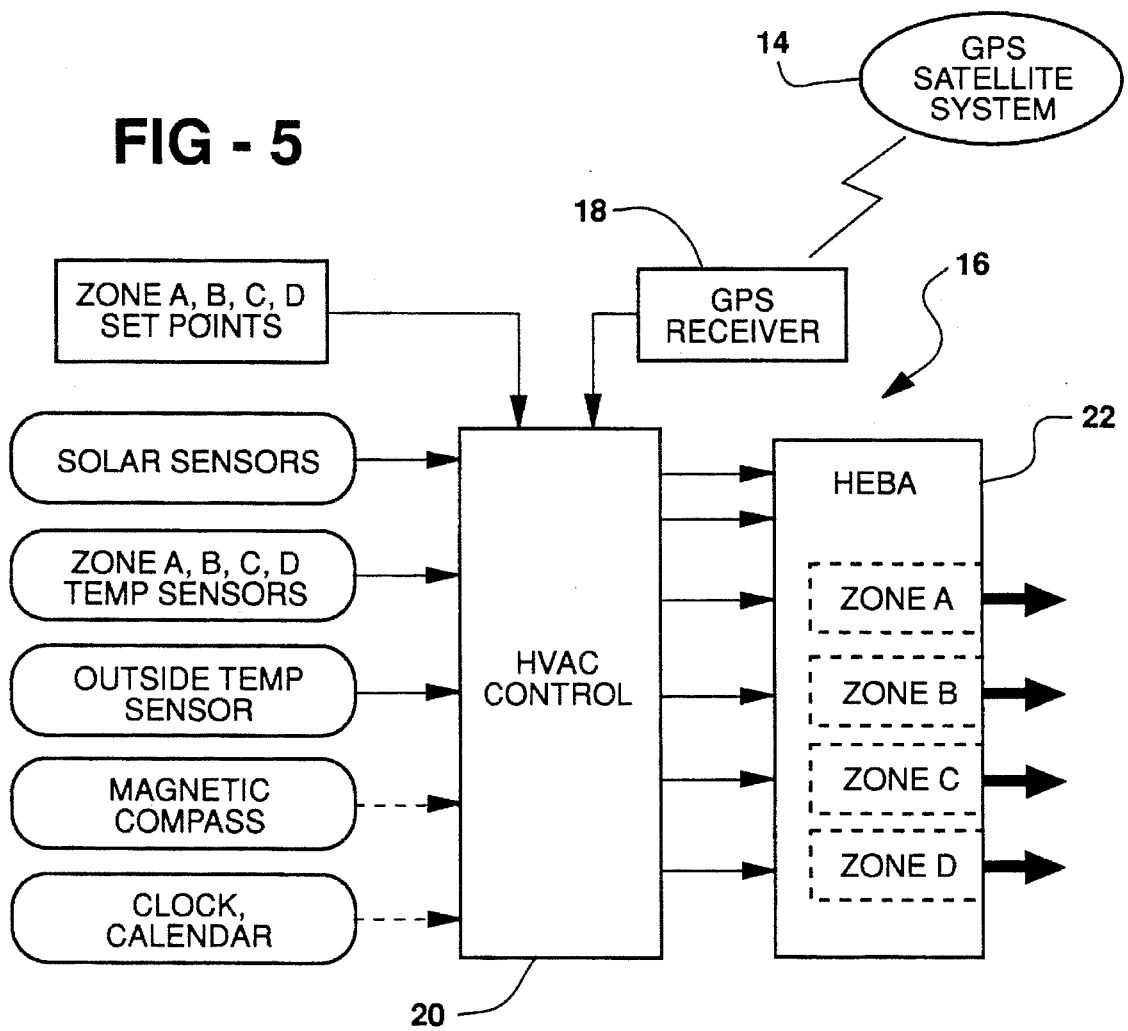
FIG. 5 is an HVAC system diagram including sun position control according to the invention.

The sun position is a function of the vehicle's geographic location, time of day, and the date or time of year. All this data is available from a satellite-based navigation system known as geographic position system or GPS. A vehicle equipped with a GPS receiver can thus obtain the necessary data for determining sun position. The vehicle heading is also available from the GPS when the vehicle is moving, so that the sun position relative to the vehicle can be determined. FIG. 5 shows a GPS satellite system 14, and a climate control system 16 which includes GPS receiver 18 for the position signals. A microprocessor-based HVAC control 20 receives inputs from the GPS receiver, set point selectors for each zone, solar sensors, temperature sensors for each zone, an outside temperature sensor, and optional magnetic compass and clock/calendar. The HVAC microprocessor is furnished with programs containing algorithms for deducing the sun position and the vehicle heading, calculating the sun load on each zone, and deriving control signals which are coupled to a heater, evaporator and blower assembly (HEBA) 22 which supplies air at the proper temperature and flow rate to each of the zones. Preferably, the controls 20 calculates a main control temperature and blower speed to satisfy a main set point for zone A, and deviations from the main settings to accommodate the selector settings and sun loads for the other zones. Apart from compensation for sun position, such HVAC controls are already known in commercial vehicles, and thus the details of the main control and zone deviations are not discussed here.

GPS signals received by the receiver specify the longitude and latitude of the vehicle, accurate within a hundred feet, as well as the time and date. With this information the sun elevation $\Phi$ and azimuth $\Theta$ (relative to true north) is readily determined from formulae used for navigation or from look-up tables based on such relationships. Such formulae are well know and are set forth in the book by Duffie, John A., *Solar Energy Thermal Processes*, John Wiley & Sons, Inc., 1974, pages 14–20, ISBN 0-471-22371-9, which is incorporated herein by reference. The heading $\alpha$ or direction of travel of the vehicle may be determined by a magnetic compass, if desired, but the information can be obtained directly from the GPS. The relative azimuth $\beta$ is thus determined as the difference between the true azimuth $\Theta$ and the heading $\alpha$.

Once the relative sun position is ascertained it remains to determine its effect on each zone. An empirical table like that shown below is established for each zone to provide a solar illumination factor (SIF) ranging between 0 and 1 for several increments of elevation and relative azimuth. Azimuth is measured counter-clockwise from the vehicle heading and an elevation of 0° is horizontal. For intermediate values of azimuth and elevation a SIF value is calculated by interpolation from the nearest table values.

| SOLOR ILLUMINATION FACTOR TABLE LEFT FRONT POSITION | | | | | | | |
|---|---|---|---|---|---|---|---|
| AZIMUTH | ELEVATION (DEGREES) | | | | | | |
| (DEGREES) | 0 | 15 | 30 | 45 | 60 | 75 | 90 |
| 0 | 0 | .33 | .8 | 1 | .75 | .5 | 0 |
| 30 | 0 | .3 | .7 | 1 | .75 | .5 | 0 |
| 60 | 0 | .3 | .7 | 1 | .8 | .5 | 0 |
| 90 | 0 | .33 | .75 | 1 | .85 | .5 | 0 |
| 120 | 0 | .3 | .5 | .9 | .5 | .35 | 0 |
| 150 | 0 | .25 | .35 | .5 | .25 | .2 | 0 |
| 180 | 0 | .25 | .2 | 0 | 0 | 0 | 0 |
| 210 | 0 | .3 | .4 | .25 | .1 | 0 | 0 |
| 240 | 0 | .35 | .7 | .5 | .2 | .1 | 0 |
| 270 | 0 | .4 | .8 | .5 | .3 | .2 | 0 |
| 300 | 0 | .4 | 1 | .8 | .45 | .3 | 0 |
| 330 | 0 | .4 | .9 | .9 | .6 | .4 | 0 |

The brightness or intensity of the sun is measured by the solar sensors to yield a solar coefficient Ksolar which is used for all zones. Then for each zone, the product of the SIF and Ksolar is a measure of solar load. A scaling factor Kt for each zone converts the solar load into degrees of temperature required to offset the load. The factor Kt may be, for example, on the order of 3° to 8° F. and is empirically determined based on human factors considerations, i.e., the perceived effect of the solar load on comfort. Then for each zone, an adjusted set point $SP_{ADJ}$ is calculated as $SP_{ADJ}=SP_{MAN}-Kt*SIF*Ksolar$, where $SP_{MAN}$ is the manually selected comfort set point. In cloudy conditions the solar load measurement will be below some threshold and then the Ksolar coefficient is assigned a value of a zero so that there is no adjustment of set point for sun load.

It is possible to adjust airflow as well as temperature to help compensate for sun load. Even where there is only one blower in a HVAC system, its speed can be set to an optimum value for the sun load and each zone air flow could be adjusted by door actuation. An adjusted fan set point $FanSP_{ADJ}$ is derived from a manual fan set point $FanSP_{MAN}$ by the relationship $FanSP_{ADJ}=FanSP_{MAN}+Kf*SIF*Ksolar$, where Kf is an empirically determined fan set point correlation. When the fan adjustment is used to provide greater airflow a smaller temperature adjustment may be desirable.

Figure 6:
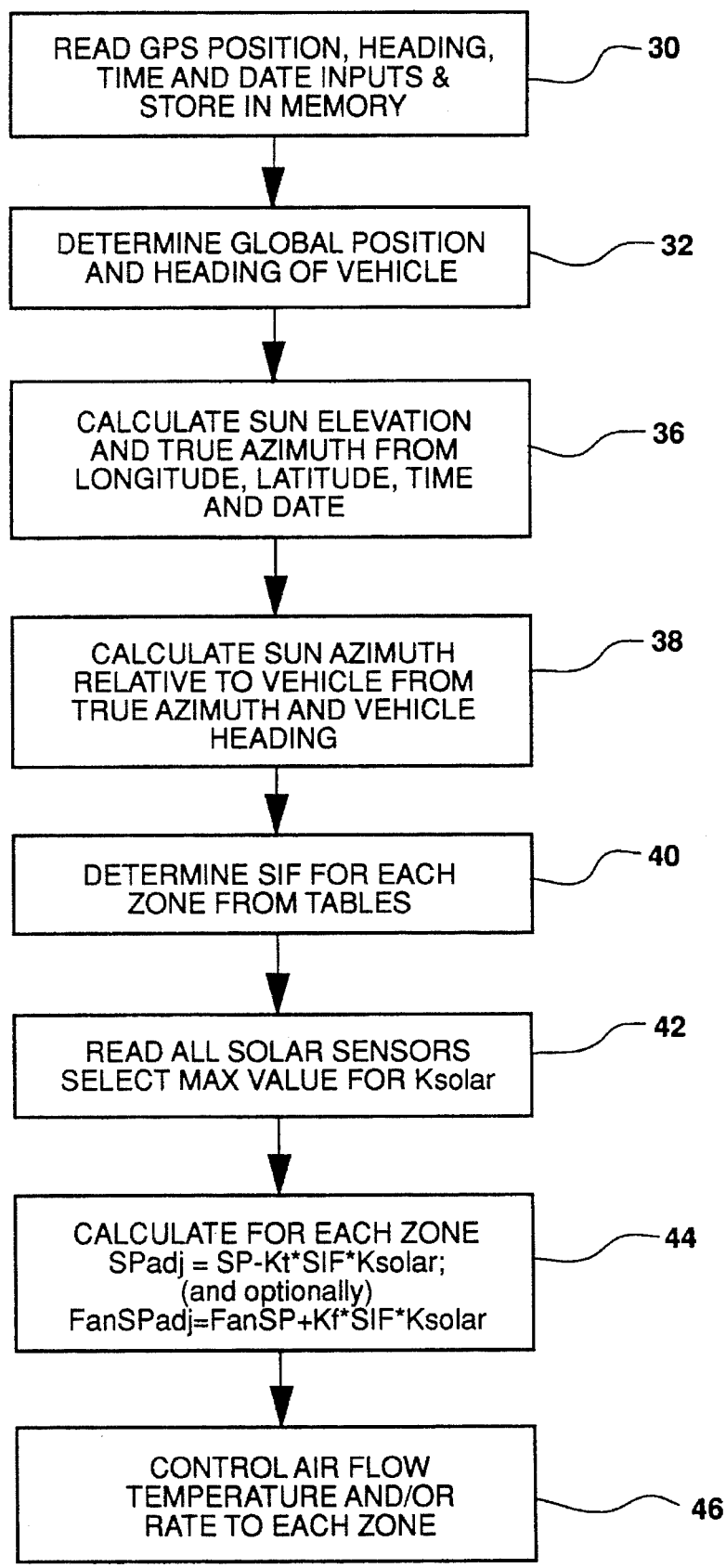
FIG. 6 is a flow chart illustrating the control method according to one embodiment of the invention.

The climate control process under supervision of the microprocessor is summarized in the flow chart of FIG. 6 wherein the functional description of each block in the chart is accompanied by a number in angle brackets <nn>which corresponds to the reference number of the block. First the GPS signal is read to obtain longitude, latitude, time, date and heading information and these values are saved <30>, and the geographic location of the vehicle is determined within about a hundred feet of accuracy <32>as well as the heading. The sun elevation and the azimuth relative to north are calculated from the longitude, latitude, time and date <36>and further using the heading, determining the azimuth relative to the vehicle <38>. Next, the SIF for each zone is found in the look up tables which are addressed by elevation and relative azimuth <40>. The maximum reading of all the solar sensors is selected as the sun intensiy Ksolar <42>. Then the temperature set point of each zone is adjusted by subtracting the product of the coefficient Kt, SIF, and Ksolar from the manual set point, and optionally a similar calculation is made for fan set point <44>. Finally, the air flow to each zone is regulated in accordance with the adjusted set point or set points <46>. Thus the air to each zone is automatically controlled as the vehicle changes heading or the sun position changes; manual input is needed only for manual set points which reflect personal preference for comfort.

Where only one zone is provided by a HVAC the same procedure applies, using only one SIF table. The main setting is adjusted for front seat or driver position comfort according to changing sun position.

Figure 7:
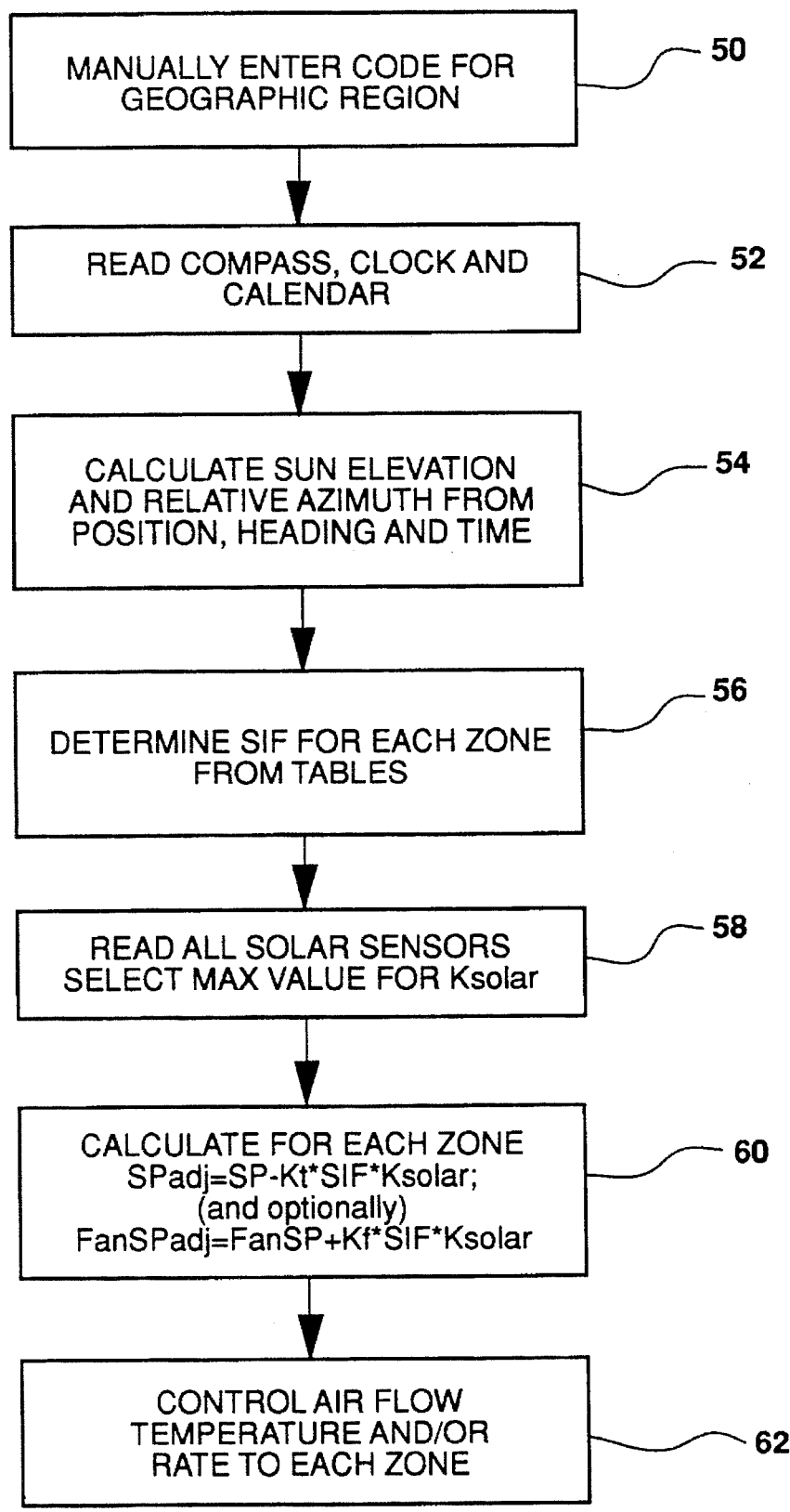
FIG. 7 is a flow chart illustrating the control method according to a second embodiment of the invention.

While the improvement in climate control operation is inexpensive for vehicles already equipped with a GPS based navigation system, another embodiment of the invention accomplishes the same end, although requiring some manual input to establish approximate geographic location. The location can be identified by the nearest major city or as a region listed in an owner's manual along with an entry code. Once entered, the location need not be changed unless the vehicle travels a long distance from the staked region or city; in that case a new entry would be needed occasionally. As indicated in FIG. 5 a magnetic compass could be used to provide real time heading information, and a clock/calendar source (such as a radio module) could be relied upon for the time and date. Then the sun position can be calculated and the HVAC is controlled as in the first embodiment. A flow chart for illustrating this procedure is shown in FIG. 7. The city or region code is manually entered <50>and the magnetic compass, clock and calendar are read <52>. Then the sun elevation and azimuth are calculated from the known position, heading and time <54>. The SIF is looked up in the tables <56>, the solar brightness is measured <58>, the adjusted set points are calculated <60>and the air flow or rate to each zone is regulated by the HVAC using the adjusted set points as the target value <62>.

It will thus be seen that according to the proposed methods and systems the comfort of occupants is enhanced by compensating the HVAC set points for changes in sun position either automatically or semi-automatically.

The embodiments of the invention in which an exclusive property or privilege is claimed are defined as follows:

1. In an automotive vehicle HVAC system, a control for air temperature and air flow having data collectors for data relevant to sun position for determining sun position and solar sensors for sensing solar load, the method of adjusting for sun load comprising the steps of:

sensing sun brightness;

collecting data pertaining to sun position;

calculating from the data sun position relative to the vehicle;

establishing an empirical table of solar illumination factors (SIF) for various sun positions;

selecting a SIF from the table on ithe basis of the sun position; and adjusting the air temperature in accordance with the SIF and the sun brightness.

2. The invention as defined in claim 1 wherein:

the sun position is identified as elevation above the horizon and azimuth with respect to the vehicle orientation; and the table includes elevation and azimuth for column and row addresses.

3. The invention as defined in claim 2 wherein the HVAC serves separate zones subject to different sun exposures and with temperature control for each zone, and the table includes a separate section for each zone wherein the method includes:

adjusting the air temperature delivered to each zone according to the azimuth and elevation.

4. The invention as defined in claim 1 wherein the step of collecting data comprises:

determining the orientation of the vehicle;

sampling a clock and a calendar to determine time of day and date; and determining the geographic location of the vehicle.

5. The invention as defined in claim 1 wherein the step of collecting data includes:

receiving a radio transmission containing location data.

6. The invention as defined in claim 1 wherein the step of collecting data includes:

receiving a radio transmission containing location data and time of day and date.

7. The invention as defined in claim 1 wherein the vehicle has a compass and a clock, and wherein the step of collecting data includes:

obtaining the compass bearing from the compass; and sampling the time and date from the clock.

8. The invention as defined in claim 1 wherein the vehicle has a receiver for transmitted heading data and the method includes:

receiving heading data during vehicle travel; and calculating vehicle heading from the heading data.

9. The invention as defined in claim 1 wherein the vehicle has a receiver for transmissions of heading data, geographic data and time and the method includes:

receiving heading and geographic data, time, and date during vehicle travel; and calculating vehicle heading from the geographic points; and calculating sun position relative to the vehicle from the heading data, the geographic data, date and time.

10. In an automotive vehicle HVAC system for controlling comfort level in multiple zones, each zone subject to a different solar load in dependence on sun position relative to the vehicle, a control for air temperature and air flow to each zone having data collectors for data on vehicle location and heading, sensors for solar load and zone air temperatures, and temperature selectors for the respective zones, the method of adjusting for sun load comprising the steps of:

sensing sun brightness;

collecting data pertaining to sun position;

calculating sun position from the data;

establishing an empirical table fair each zone of solar illumination factors (SIFs) for various sun positions relative to the vehicle;

selecting SIFs from the table on the basis of the sun position;

measuring air temperature of each zone;

calculating air temperature to each zone and air flow on the basis of the selected temperature, the zone air temperature, the sun brightness and the zone SIF; and controlling the air temperature and flow to each zone in accordance with calculated values.

11. The invention as defined in claim 10 wherein the SIFs are a measure for each zone of the effect on the sun load of sun elevation and azimuth relative to the vehicle.

12. The invention as defined in claim 10 wherein the step of collecting data pertaining to sun position comprises:

receiving transmitted data on geographic position of the vehicle;

sensing the vehicle heading; and sensing the time of day and the date;

whereby the sun elevation and azimuth is calculated to determine, along with sun brightness, the sun load effect on each zone.

13. The invention as defined in claim 10 wherein the step of collecting data includes:

determining the orientation of the vehicle;

sampling a clock and a calendar to determine time of day and date; and determining the geographic location of the vehicle.

14. The invention as defined in claim 10 wherein the step of collecting data includes:

receiving a radio transmission containing location data.

15. The invention as defined in claim 10 wherein the step of collecting data includes:

receiving a radio transmission containing location data and time of day and date.

16. The invention as defined in claim 10 wherein the vehicle has a compass and a clock, and wherein the step of collecting data includes:

obtaining the compass bearing from the compass; and sampling the time and date from the clock.

17. An automotive vehicle HVAC system for controlling comfort level in multiple zones having manually controlled comfort settings, each zone subject to a different solar load in dependence on sun position relative to the vehicle, a control for regulating the temperature of air flow to each zone to compensate for solar load comprising:

means for collecting data on time, date, vehicle location and heading;

means for sensing solar load;

means for determining sun position relative to the vehicle from collected data; and means for adjusting air flow temperature to each zone in accordance with the determined sun position and solar load.

18. The invention as defined in claim 17 wherein the means for collecting data includes a receiver for broadcast position signals.

19. The invention as defined in claim 17 wherein the means for collecting data includes a magnetic compass for furnishing heading information.

20. The invention as defined in claim 17 wherein the means for determining sun position includes a microprocessor programmed to determine sun position from the time, date, and vehicle location data.

21. The invention as defined in claim 17 wherein the control includes a microprocessor and wherein the means for adjusting air flow temperature includes:

a table in the control for each zone containing solar illumination factors for various sun positions; and means for adjusting temperature to each zone in accordance with a solar illumination factor and solar load.

22. The invention as defined in claim 17 wherein the control includes a microprocessor and wherein the means for adjusting air flow temperature includes:

a table in the control for each zone containing solar illumination factors for various sun positions; and zone temperature adjustment means for altering the effective comfort settings in accordance with solar load and solar illumination factors selected on the basis of sun position.

* * * * *